United States Patent
Lee (10) Patent No.: US 7,020,379 B2
(45) Date of Patent: Mar. 28, 2006

(54) ILLUMINATION OPTICAL SYSTEM INCLUDING LIGHT SEPARATION/INTEGRATION DEVICE HAVING DIFFRACTION DEVICE AND IMAGE DISPLAY APPARATUS INCLUDING THE ILLUMINATION OPTICAL SYSTEM

(75) Inventor: Young-chol Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/600,655

(22) Filed: Jun. 23, 2003

(65) Prior Publication Data
US 2004/0062482 A1   Apr. 1, 2004

(30) Foreign Application Priority Data
Jun. 25, 2002   (KR) .............. 10-2002-0035672

(51) Int. Cl.
*G02B 6/42* (2006.01)
*G02B 6/26* (2006.01)

(52) U.S. Cl. .................... 385/901; 385/39

(58) Field of Classification Search ............ 385/10, 385/39, 48, 123, 133, 146–148, 901, 37; 362/235, 385; 350/15
See application file for complete search history.

(56) References Cited

U.S. PATENT DOCUMENTS

| | | | |
|---|---|---|---|
| 5,101,458 A * | 3/1992 | Spaulding et al. ............ 385/36 |
| 5,625,738 A | 4/1997 | Magarill | |
| 6,172,816 B1 * | 1/2001 | Tadic-Galeb et al. ........ 359/649 |
| 6,512,502 B1 * | 1/2003 | Ho et al. ...................... 345/84 |
| 6,567,217 B1 * | 5/2003 | Kowarz et al. ............. 359/618 |
| 2003/0025842 A1 * | 2/2003 | Saccomanno ............... 348/758 |
| 2004/0190573 A1 * | 9/2004 | Kruschwitz et al. .......... 372/39 |

* cited by examiner

*Primary Examiner*—Kaveh Kianni
*Assistant Examiner*—Christopher M. Kalivoda
(74) *Attorney, Agent, or Firm*—Staas & Halsey LLP (57) ABSTRACT

An illumination optical system includes a light source which emits light, and a light separation/integration device having a diffraction device on at least one incident side. The diffraction device diffracts light to decrease an incident angle to a predetermined range. An image display apparatus includes the illumination optical system, an image optical system which modulates light incident from the illumination optical system to form an image, and a projection optical system which projects the light reflected from the image optical system onto a screen.

44 Claims, 7 Drawing Sheets

FIG. 6B

ILLUMINATION OPTICAL SYSTEM INCLUDING LIGHT SEPARATION/INTEGRATION DEVICE HAVING DIFFRACTION DEVICE AND IMAGE DISPLAY APPARATUS INCLUDING THE ILLUMINATION OPTICAL SYSTEM

CROSS-REFERENCE TO RELATED APPLICATIONS

This application claims the benefit of Korean Patent Application No. 2002-35672, filed on Jun. 25, 2002, in the Korean Intellectual Property Office, the disclosure of which is incorporated herein by reference.

BACKGROUND OF THE INVENTION

1. Field of the Invention

The present invention relates to an illumination optical system and an image display apparatus including the same, and more particularly, to an illumination optical system including a light separation/integration device having a diffraction device, and an image display apparatus including the illumination optical system.

2. Description of the Related Art

Figure 1:
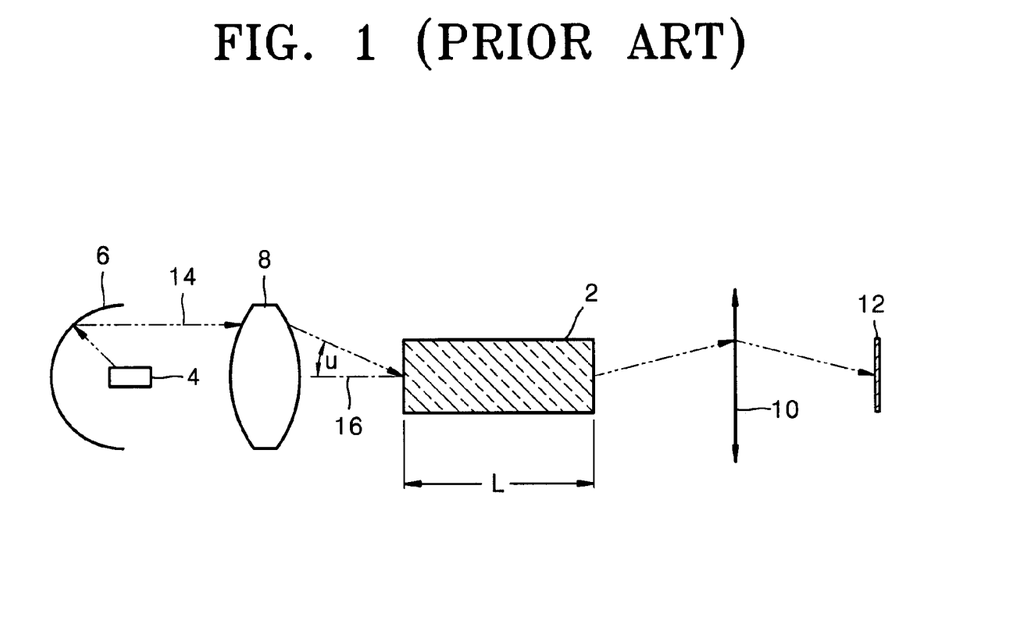
FIG. 1 is a diagram of a conventional apparatus which illuminates a light valve.

FIG. 1 shows a conventional apparatus which uniformly illuminates a light valve, as disclosed in U.S. Pat. No. 5,625,738. As shown in FIG. 1, the conventional illumination apparatus includes a light source 4 having a focusing mirror 6, a collecting lens 8 which is disposed adjacent to the light source 4 and collects light from the light source 4, and a light tunnel 2 which receives the light collected by the collecting lens 8. The light tunnel 2 may be hollow with interior reflecting walls or have a space filled with a light transparent material. The light tunnel 2 has a length L and a rectangular cross section.

The light emitted from the light source 4 is incident on the light tunnel 2 at an angle "u" with a line 16, a longitudinal axis of the light tunnel 2, and while passing through the light tunnel 2, the intensity of the light is made uniform. The light is shaped through the light tunnel 2 and relayed to a light valve 12 by a relay unit 10.

To embody a color image, such a conventional illumination apparatus also includes a color filter (not shown), a color wheel (not shown), or an X-cube (not shown) as a color switching device on an optical path between the collecting lens 8 and the light tunnel 2 to separate the light according to predetermined wavelengths. However, where the light is separated using the color wheel or the color filter, only a single color light beam in white light passes through a predetermined region of the color wheel or the color filter. Accordingly, the light efficiency thereof is degraded. Where the X-cube is used, since the light incident from an existing light source diverges, a light reflectivity or transmissivity of a coating layer of the X-cube at a boundary decreases, decreasing the entire efficiency of the emitted light. This is because the reflectivity or transmissivity of the coating layer of the X-cube is dependent on a diverging angle of the light.

Additionally, an optical element, such as the light tunnel 2, that uniformizes the intensity of the light must be lengthened where a numerical aperture of the light incident from the light source 4 is small. Accordingly, it is difficult to manufacture a light weight and compact image display apparatus with the conventional optical element.

SUMMARY OF THE INVENTION

Accordingly, it is an aspect of the present invention to provide a thin and compact illumination optical system which uniformizes a light intensity by adjusting a diverging angle of light incident on a light separation/integration device included in the illumination optical system.

Another aspect of the prevent invention is to provide an illumination optical system which uses a decreasing number of relay lenses, thereby decreasing a light loss, and an inexpensive image display apparatus having a high luminance and picture quality.

Additional aspects and advantages of the invention will be set forth in part in the description which follows and, in part, will be obvious from the description, or may be learned by practice of the invention.

To achieve the above and/or other aspects of the present invention, there is provided an illumination optical system comprising a light source which emits light, and a light separation/integration device including a diffraction device which is provided on at least one incident side of the light separation/integration device, wherein the diffraction device diffracts the light to adjust an incident angle thereof to a predetermined range.

The light separation/integration device may be an X-cube, and the diffraction device may be a diffraction optical element (DOE) or a holographic optical element (HOE).

The illumination optical system may further comprise a light guide unit which is provided on an optical path between the light source and the light separation/integration device. The light guide unit may be an optical fiber.

The illumination optical system may further comprise a relay lens unit which is provided between the light source and the light separation/integration device.

The illumination optical system may further comprise an optical path separation device which is provided between the light source and the light separation/integration device, reflects the light incident thereon and outputs the light straight ahead. The optical path separation device may be a total internal reflection (TIR) prism.

To achieve the above and/or other aspects of the present invention, there is provided an image display apparatus to form an image, comprising an illumination optical system including a light source which emits light and a light separation/integration device which includes a diffraction device provided on at least one incident side thereof, wherein the diffraction device diffracts the light to adjust an incident angle thereof to a predetermined range. The image display apparatus further comprises an image optical system which modulates the light incident from the illumination optical system to form the image, and a projection optical system which projects light reflected from the image optical system.

The light separation/integration device may be an X-cube, and the diffraction device may be a DOE or a HOE.

The image display apparatus may further comprise a light guide unit which is provided on an optical path between the light source and the light separation/integration device. The light guide unit may be an optical fiber.

The image optical system may include a panel which modulates the light incident from the illumination optical system according to an image signal to generate the image.

The illumination optical system may further comprise a glass road which uniformizes an intensity of the light between the light separation/integration device and the panel.

The image optical system may further include an optical path separation device which is provided on an optical path between the glass road and the panel reflects the light incident thereon and transmits the light straight ahead. The optical path separation device may be a TIR prism.

The image optical system may further include a collecting lens which is provided on an optical path between the glass road and the optical path separation device.

The projection optical system may include a projection lens which projects the image formed by the image optical system onto a screen external to the display apparatus.

The illumination optical system may further include a relay lens unit which is provided on an optical path between the light source and the light separation/integration device.

The image optical system may include a relay lens unit which is provided on an optical path between the light separation/integration device and the projection optical system.

The image optical system may further include an optical path separation device which is provided on an optical path between the light source and the light separation/integration device, reflects the light incident thereon and outputs the light straight ahead. The optical path separation device may be a TIR prism.

The present invention provides a diffraction device for a light separation/integration device so as to adjust a diverging angle of light incident on the light separation/integration device, thereby increasing the efficiency of the light reflected within the light separation/integration device. In addition, since the diffraction device can have a power, the number of relay lenses used to uniformize the light intensity is reduced.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
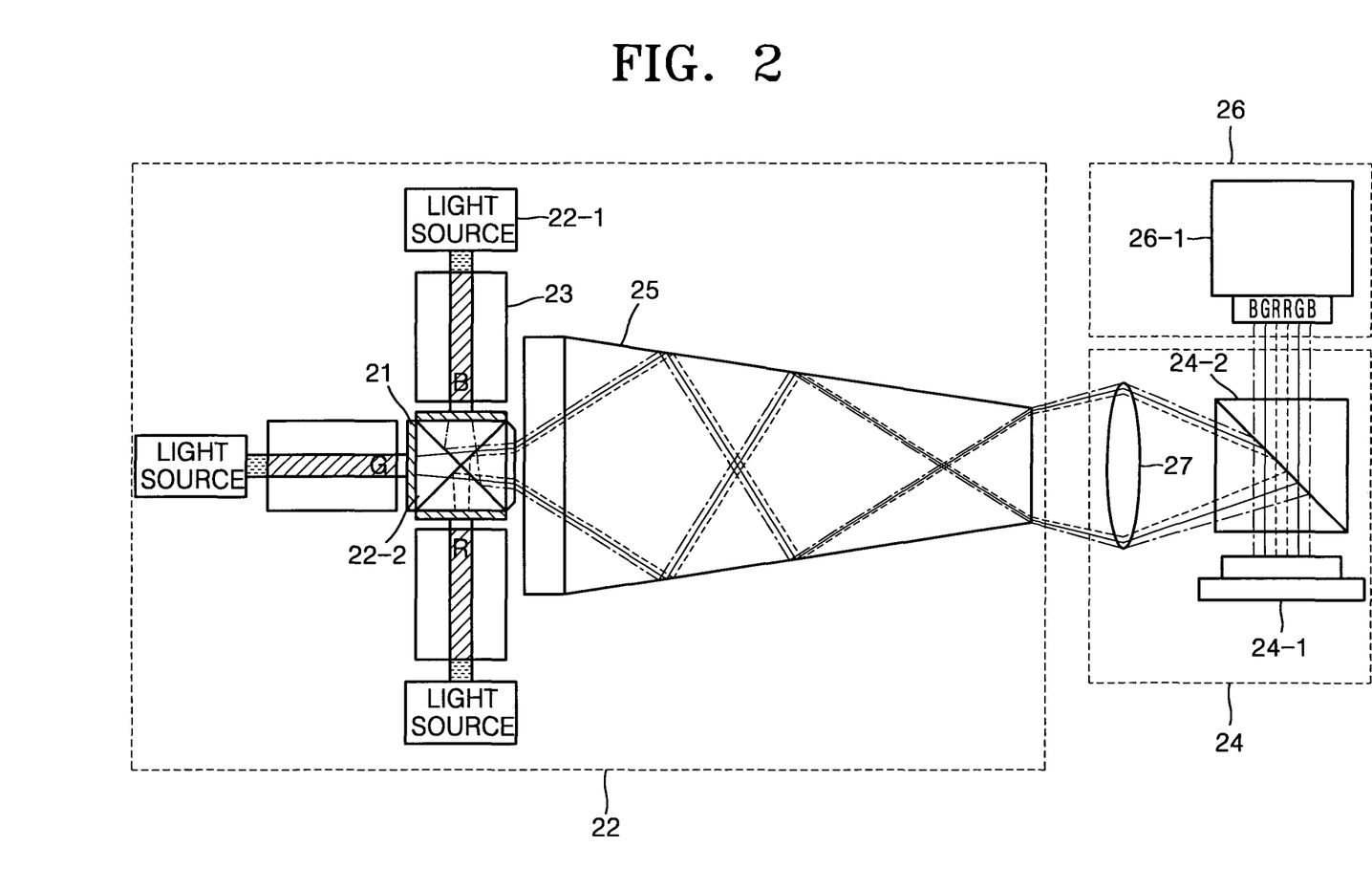
FIG. 2 is a diagram illustrating an illumination optical system according an embodiment of the present invention and an image display apparatus including the illumination optical system.

FIG. 2 shows an illumination optical system according to an embodiment of the present invention, and an image display apparatus including the illumination optical system 22. As shown in FIG. 2, the illumination optical system 22 includes light sources 22-1 which emit different color light beams having different wavelengths and an X-cube 22-2 provided with a diffraction device 21 on each light incident side thereof. The diffraction devices 21 adjust incident angles of the different color light beams incident from the light sources 22-1, respectively.

An optical fiber 23 is also provided between each light source 22-1 and a corresponding one of the light incident sides of the X-cube 22-2, so as to adjust the incident angle of light on the X-cube 22-2 within a predetermined range. A glass rod 25 is disposed on a path of light emitted from the X-cube 22-2 so as to uniformize the intensity of the light.

An optical device, for example, a diffraction optical element (DOE) or a holographic optical element (HOE) may be used as the diffraction device 21 and can be directly formed on an incident side of the X-cube 22-2, or separately manufactured and then attached to the X-cube 22-2. The X-cube 22-2 is a light separation/integration device having an X-shaped coating layer which transmits or reflects light. The coating layer of the X-cube 22-2 may have different reflectivity and transmissivity depending on an incident angle of the light. Accordingly, the incident angle of the light on the coating layer is adjusted within a predetermined range to reduce a light loss.

Figure 3:
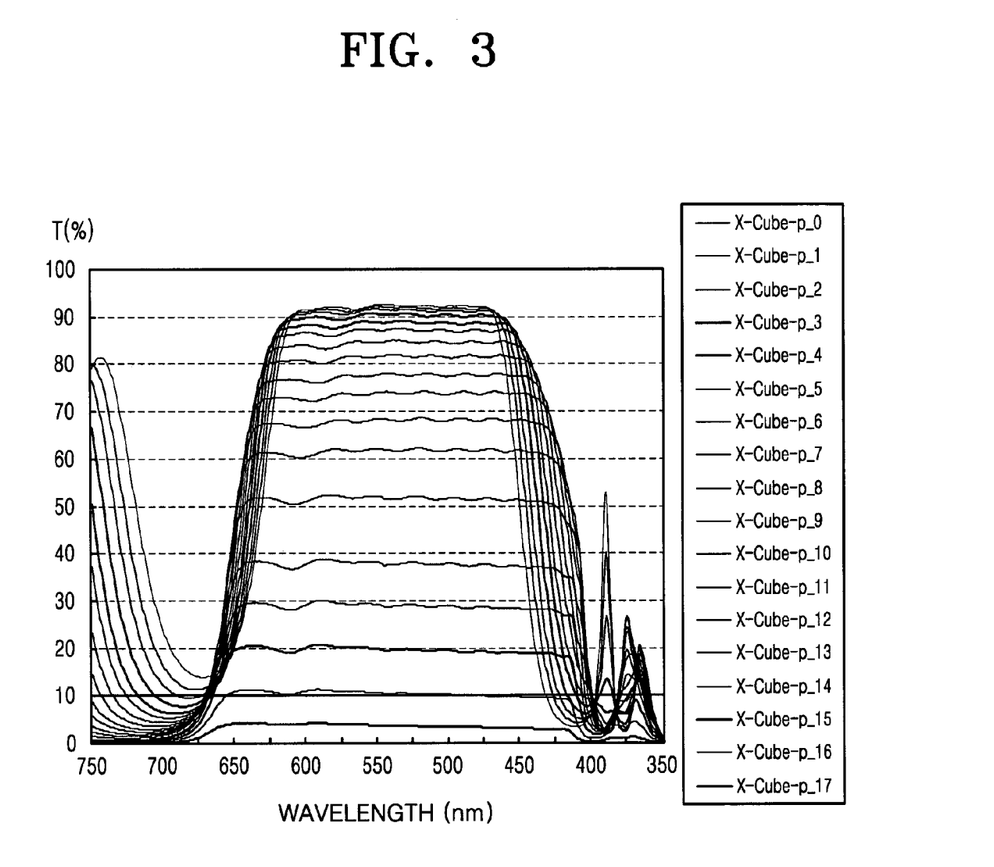
FIG. 3 is a graph of a transmissivity of an X-cube for light of different wavelengths depending on a change in an incident angle.

FIG. 3 shows a graph illustrating a transmissivity of an X-cube for light of different wavelengths depending on a change in an incident angle. Referring to FIG. 3, the transmissivity is highest where light having a wavelength ranging from 400 nm to 700 nm is incident on a coating layer of the X-cube 22-2 at an angle of 0 (i.e., in case of X-Cube-p_0). As the incident angle increases, the transmissivity decreases. Where the incident angle exceeds 11 degrees (X-Cube-p_11) and is at least 12 degrees (X-Cube-p_12), the transmissivity decreases below 50%.

The illumination optical system 22 includes the diffraction device 21 to diffract light incident from the optical fiber 23 so as to have the light is incident on the coating layer of the X-cube 22-2 at a diverging angle of a minimum of 0 degrees and a maximum of 4–8 degrees, thereby increasing the transmissivity of the X-cube 22-2 to 70% or more to minimize the loss of the transmitted light. However, the transmissivity shown in FIG. 3 is only an example, and the transmissivity can be increased to 80% or more where a coating layer of a good quality is formed. At this time, it is understood that a light separation/integration device with the diffraction device 21 is not limited to the X-cube 22-2.

FIG. 2 shows an image display apparatus which includes the illumination optical system 22 having the X-cube 22-2 as a light separation/integration device with a diffraction device. Referring to FIG. 2, light is emitted from the light sources 22-1 of the illumination optical system 22, transmitted through the optical fibers 23 with total reflection, and separated into red (R), green (G), and blue (B) light beams having different wavelengths at a boundary of the X-cube 22-2 on which the coating layer is formed. The R, G, and B light beams are incident on an image optical system 24 and converted to generate an image according to an electrical image signal. The image is projected onto a screen (not shown) by a projection optical system 26.

The image optical system 24 includes a collecting lens 27 which collects light incident from the glass rod 25, a panel 24-1 which converts the light incident from the collecting lens 27 according to the electrical image signal to form the image, and an optical path separation device 24-2 which is disposed on an optical path between the collecting lens 27 and the panel 24-1 to reflect the light incident from the collecting lens 27 to the panel 24-1 and transmit the light reflected from the panel 24-1 to the projection optical system 26. For example, a digital micromirror device (DMO) and a total internal reflection (TIR) prism can be used as the panel 24-1 and the optical path separation device 24-1, respectively. Also, a liquid crystal on silicon (LCOS) and a polarization beam splitter (PBS) can be used as the panel 24-1 and the optical path separation device 24-1, respectively.

The projection optical system 26 includes a projection lens 26-1 which radiates the light, that has been reflected from the panel 24-1 and transmitted through the optical path separation device 24-2, on the screen, thereby reproducing the image generated by the panel 24-1. The image optical system 24 and the projection optical system 26 may also include a collecting lens or an optical element to guide the light as desired.

Figure 4A:
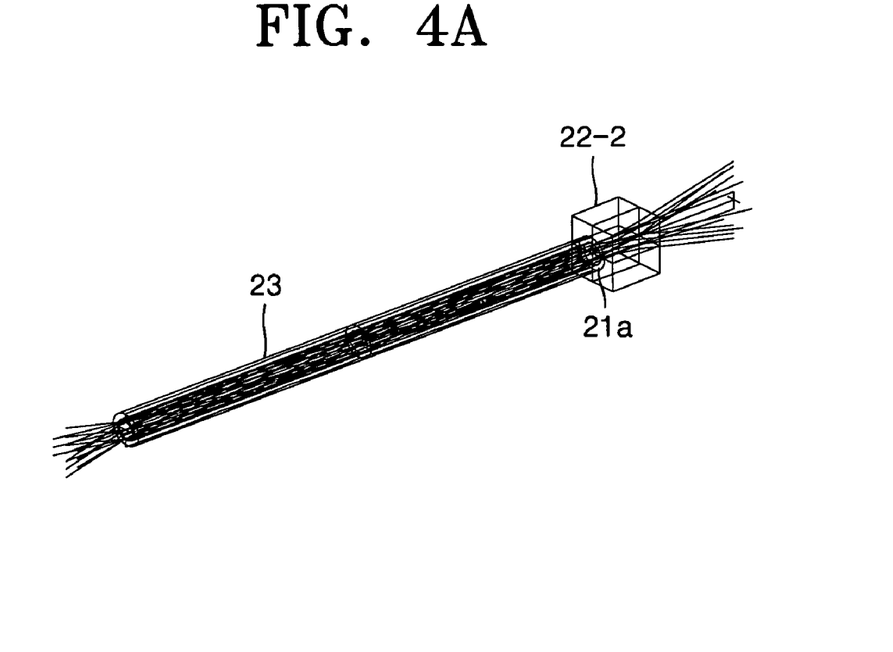
FIG. 4A is a partial perspective view of a simulation of an illumination optical system which includes an X-cube having a diffraction device for a single light source on its incident side according to the present invention.
Figure 4B:
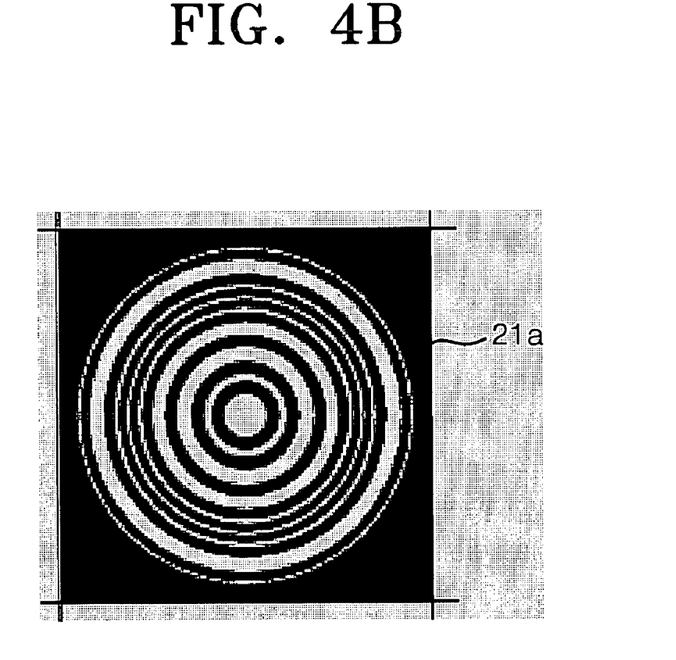
FIG. 4B is a plane view of a ring-patterned diffraction device formed on the X-cube shown in FIG. 4A.

FIG. 4A shows a partial perspective view of a simulation of an illumination optical system including an X-cube 22-2 having a diffraction device 21a and an optical fiber 23 for a single light source on its incident side, according to the present invention. FIG. 4B is a plane view of the diffraction device 21a formed in a ring pattern.

Referring to FIG. 4A, light transmitted through the optical fiber 23 is diffracted by the diffraction device 21a so as to have the light incident on the X-cube 22-2 at diverging angles of a minimum of 0 degrees and a maximum of 4–8 degrees, and output from the X-cube 22-2 with a maximum light efficiency. The ring pattern formed on the X-cube 22-2 has a radius of about 0.2 nm and may be realized as a DOE, in which mechanical irregularities form a grating, or a HOE, in which an interference pattern between reference light and standard light forms a grating. Where the diffraction device 21 is realized as an HOE, a diffraction angle of the light output can be adjusted by appropriately adjusting a grating space, i.e., pitch, and a grating depth of the HOE.

Figure 4C:
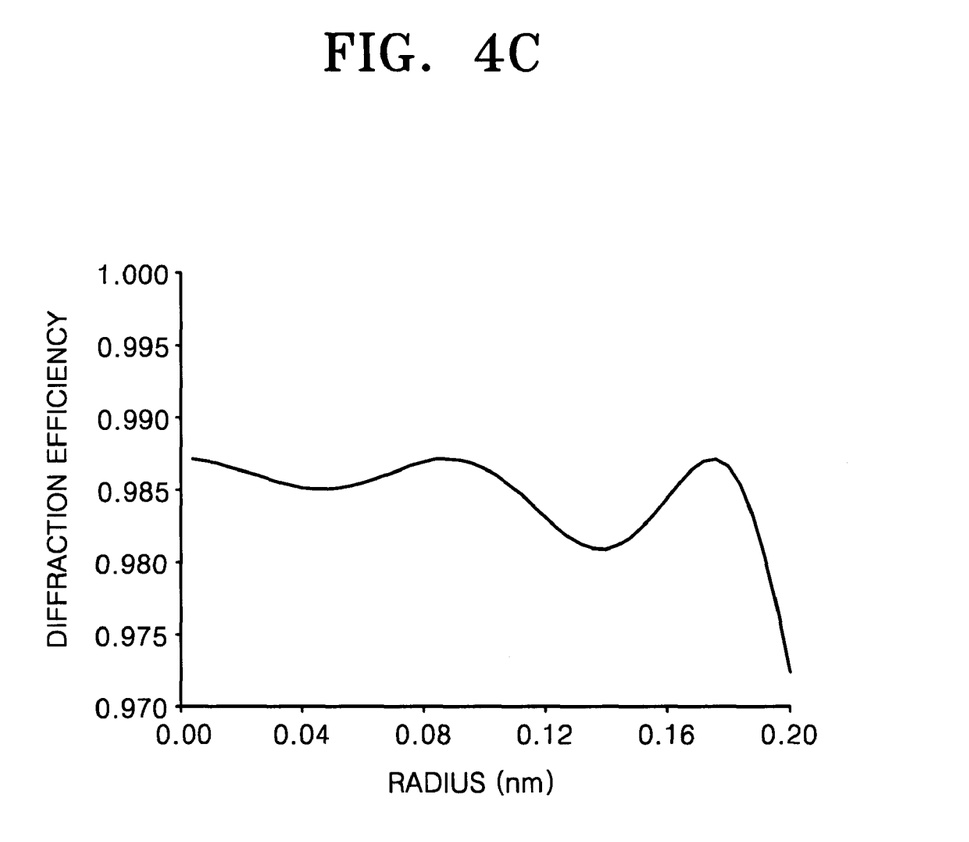
FIG. 4C is a graph of a diffraction efficiency versus a radius of a diffraction device.

FIG. 4C shows a graph of a diffraction efficiency versus a radius from the center of the diffraction device 21a formed on the incident side of the X-cube 22-2. Referring to FIG. 4C, the diffraction efficiency is about 98.7% at the center of the incident side. Although the diffraction efficiency repeatedly increases and decreases as the radius increases, even the minimum diffraction efficiency is greater than 97%. It can be inferred from the graph shown in FIG. 4C that the diffraction device 21a, which can adjust a diverging angle of light within a maximum of 4–8 degrees by appropriately adjusting a pitch and a grating depth, has high diffraction efficiency exceeding 97%.

Figure 5:
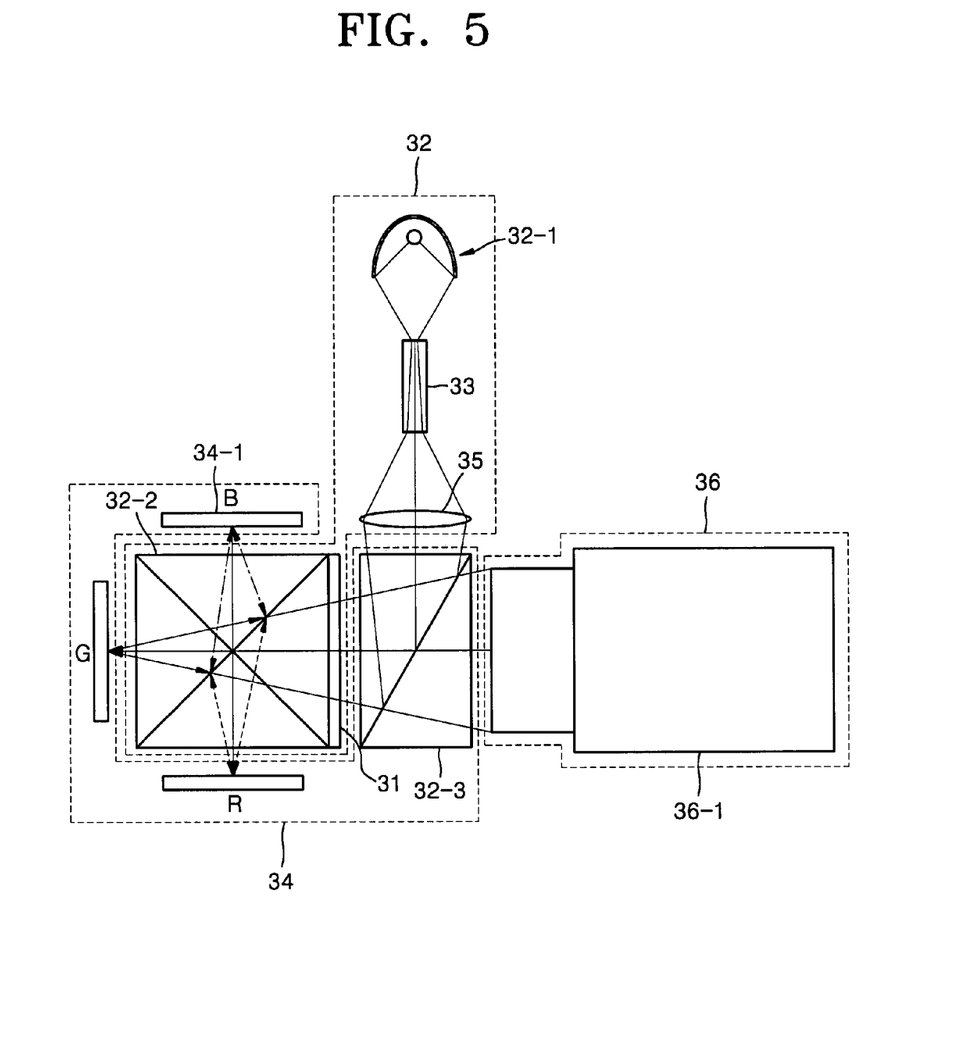
FIG. 5 is a diagram illustrating an illumination optical system according another embodiment of the present invention and an image display apparatus including the illumination optical system.

FIG. 5 shows an illumination optical system 32 according to another embodiment of the present invention, and an image display apparatus including the illumination optical system 32. As shown in FIG. 5, the illumination optical system 32 includes a light source 32-1 which emits white light and an X-cube 32-2, which has a diffraction device 31 on its incident side to adjust a diverging angle of the light incident from the light source 32-1 and a coating layer to separate the incident light into R, G, and B light beams by wavelengths, and transmit and reflect the R, G, and B light beams. A glass rod 33 is also provided on an optical path between the light source 32-1 and the X-cube 32-2 to uniformize the light intensity. A relay lens 35 can be provided on an optical path in front of the glass rod 33 so as to uniformize the light intensity. The relay lens 35 can be used to collimate light. An optical path separation device 32-3 is disposed on an optical path between the relay lens 35 and the X-cube 32-2. The optical path separation device 32-3 reflects light from the relay lens 35 to the X-cube 32-2 and transmits the light from the X-cube 32-2 to a projection optical system 36.

As with the diffraction device 21 included in the illumination optical system 32, the diffraction device 31 disposed on the incident side of the X-cube 32-2 has a grating, which ranges a diverging angle of light from a minimum of 0 degrees to a maximum of 4–8 degrees, thereby minimizing a light loss during a light separation and integration in the X-cube 32-2. In addition, where the diffraction device 31 included in the illumination optical system 32 has a power, the number of relay lenses 35 used to uniformize the light intensity can be decreased, thereby making the illumination optical system 32 compact. Like the diffraction device 21 of FIG. 2, the diffraction device 31 may be realized as a DOE or a HOE.

The image display apparatus of FIG. 5 includes the illumination optical system 32, an image optical system 34 having three panels 34-1, which receives light from the illumination optical system 32 and modulates the received light according to an electrical image signal to generate an image, and a projection optical system 36 having a projection lens 36-1, which projects light reflected from the image optical system 34 onto a screen (not shown). The image optical system 34 and the projection optical system 36 may also include a collecting lens or an optical element to guide the light as desired.

Figure 6A:
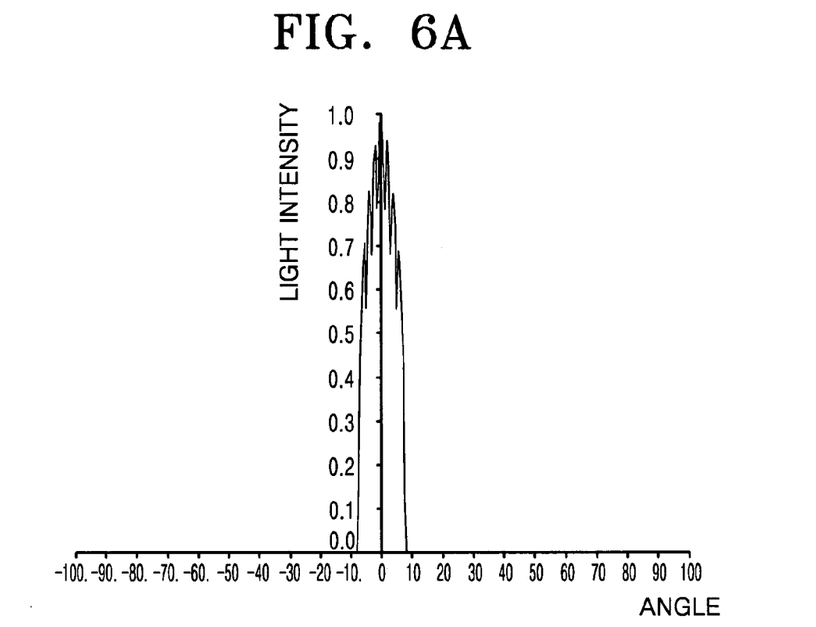
FIGS. 6A and 6B are graphs of relative light intensity with respect to an angle at which light is emitted from an X-cube, where the X-cube does not have a diffraction optical element (DOE), FIG. 6A, and where the X-cube has a DOE, FIG. 6B, in the illumination optical system of FIG. 5.
Figure 6B:
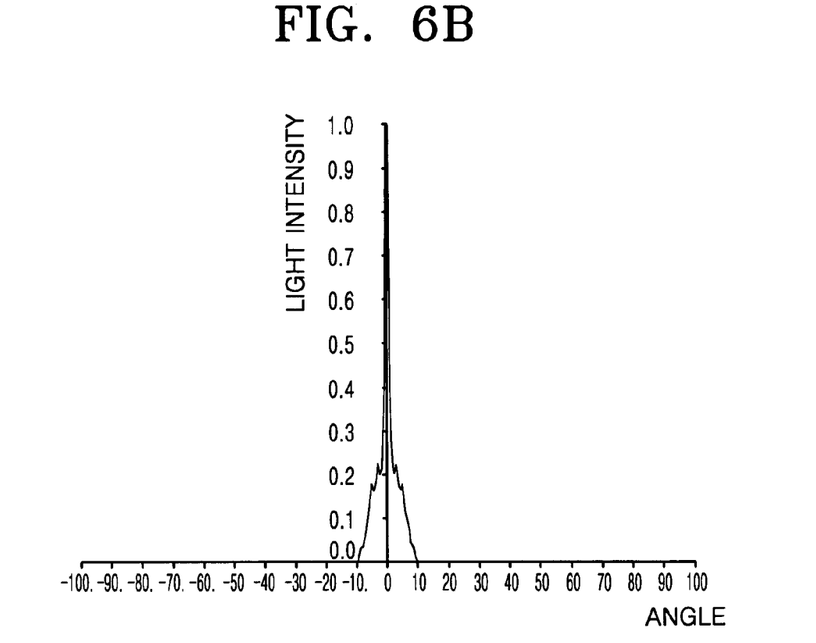

FIGS. 6A and 6B show graphs of relative light intensity with respect to an angle at which light is emitted from the X-cube 32-2, where the X-cube 32-2 does not have a DOE, FIG. 6A, and where the X-cube 32-2 has a DOE, FIG. 6B, in the illumination optical system 32 according to the present invention. Referring to FIG. 6A, where the X-cube 32-2 does not have a DOE, light intensity is uniform at an angle ranging from 0 to ±10. Accordingly, it can be inferred that a light loss increases as light proceeds through an illumination optical system. Conversely, referring to FIG. 6B, where the X-cube 32-2 has a DOE, light intensity is high at an angle around 0 degrees and thus has a delta-function distribution. Accordingly, it is inferred that a light loss remarkably decreases although light proceeds through an illumination optical system.

The present invention provides a diffraction device for a light separation/integration device, for example, an X-cube to adjust a diverging angle of light incident on the light separation/integration device. The light is transmitted through and reflected from a coating layer within the X-cube, thereby decreasing a light loss and increasing the efficiency of the light output to an image optical system and a projection optical system. Additionally, since the present invention provides a diffraction device having a power, the number of relay lenses included in an illumination optical system can be decreased, thereby making it possible to manufacture a light weight, thin, simple, and compact image display apparatus.

That is, according to an illumination optical system of the present invention and an image display apparatus including the same, a diffraction device is provided for a light separation/integration device to make light incident on the light separation/integration device at a diverging angle within a predetermined range, thereby minimizing a light loss in the light separation/integration device. In addition, since the diffraction device can be provided with a power, the number of relay lenses can be decreased, thereby making it possible to manufacture a light weight, thin, simple, and compact image display apparatus.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An illumination optical system comprising:
    a light source emitting light;
    a light separation/integration device having an incident side facing the light source and an exit side from which light from the light source exits; and
    a diffraction device provided directly on the incident side of the light separation/integration device facing the light source,
    wherein the diffraction device diffracts the light incident from the light source to adjust an incident angle at the incident side of the light separation/integration device to a predetermined range.

2. The illumination optical system of claim 1, wherein the light separation/integration device is an X-cube.

3. The illumination optical system of claim 1, wherein the diffraction device is a diffraction optical element (DOE) or a holographic optical element (HOE).

4. The illumination optical system of claim 2, wherein the diffraction device is a diffraction optical element (DOE) or a holographic optical element (HOE).

5. The illumination optical system of claim 1, further comprising a light guide unit which is provided on an optical path between the light source and the light separation/integration device.

6. The illumination optical system of claim 2, further comprising a light guide unit which is provided on an optical path between the light source and the light.

7. The illumination optical system of claim 5, wherein the light guide unit is an optical fiber.

8. The illumination optical system of claim 6, wherein the light guide unit is an optical fiber.

9. The illumination optical system of claim 1, further comprising a relay lens unit which is provided between the light source and the light separation/integration device.

10. The illumination optical system of claim 2, further comprising a relay lens unit which is provided on an optical path between the light source and the light separation/integration device.

11. The illumination optical system of claim 1, further comprising an optical path separation device which is provided between the light source and the light separation/integration device.

12. The illumination optical system of claim 2, further comprising an optical path separation device which is provided between the light source and the light separation/integration device.

13. The illumination optical system of claim 11, wherein the optical path separation device is a total internal reflection (TIR) prism.

14. The illumination optical system of claim 12, wherein the optical path separation device is a total internal reflection (TIR) prism.

15. An image display apparatus to form an image, comprising:
    an illumination optical system comprising a light source emitting light, a light separation/integration device having an incident side facing the light source and an exit side from which light from the light source exits, and a diffraction device provided directly on the incident side of the light separation/integration device facing the light source, wherein the diffraction device diffracts the light incident from the light source to adjust an incident angle at the incident side of the light separation/integration device to a predetermined range;
    an image optical system which modulates the light incident from the illumination optical system to form the image; and
    a projection optical system which projects the light reflected from the image optical system.

16. The image display apparatus of claim 15, wherein the light separation/integration device is an X-cube.

17. The image display apparatus of claim 15, wherein the diffraction device is a diffraction optical element (DOE) or a holographic optical element (HOE).

18. The image display apparatus of claim 15, further comprising a light guide unit which is provided on an optical path between the light source and the light separation/integration device.

19. The image display apparatus of claim 18, wherein the light guide unit is an optical fiber.

20. The image display apparatus of claim 15, wherein the image optical system comprises a panel which modulates the light incident from the illumination optical system according to an image signal of the display apparatus to generate the image.

21. The image display apparatus of claim 20, wherein the illumination optical system further comprises a glass rod which uniformizes an intensity of the light between the light separation/integration device and the panel.

22. The image display apparatus of claim 21, wherein the image optical system further comprises an optical path separation device which is provided on an optical path between the glass rod and the panel, reflects the light from the light separation/integration device and transmits the light from the panel.

23. The image display apparatus of claim 22, wherein the image optical system further comprises a collecting lens which is provided on an optical path between the glass rod and the optical path separation device.

24. The image display apparatus of claim 15, wherein the projection optical system comprises a projection lens which projects the image formed by the image optical system onto a screen external to the display apparatus.

25. The image display apparatus of claim 15, wherein the illumination optical system further comprises a relay lens unit which is provided on an optical path between the light source and the light separation/integration device.

26. The image display apparatus of claim 15, wherein the image optical system comprises a relay lens unit which is provided on an optical path between the light separation/integration device and the projection optical system.

27. The image display apparatus of claim 20, wherein the image optical system further comprises a relay lens unit which is provided on an optical path between the light separation/integration device and the projection optical system.

28. The image display apparatus of claim 15, wherein the image optical system comprises an optical path separation device which is provided on an optical path between the light source and the light separation/integration device, reflects the light from the light source and transmits the light from the light separation/integration device.

29. The image display apparatus of claim 20, wherein the image optical system further comprises an optical path separation device which is provided on an optical path between the light source and the light separation/integration device, reflects the light from the light separation/integration device and transmits the light from the panel.

30. The image display apparatus of claim 22, wherein the optical path separation device is a total internal reflection (TIR) prism.

31. The image display apparatus of claim 29, wherein the optical path separation device is a total internal reflection (TIR) prism.

32. The illumination optical system of claim 1, wherein the diffraction device diffracts the light so as to have the light incident on a coating layer of the light separation/integration device at a diverging angle of a minimum of 0 degrees and a maximum of 4–8 degrees.

33. The illumination optical system of claim 1, wherein the diffraction device decreases the incident angle of the light so as to reduce a light loss of the illumination optical system.

34. The illumination optical system of claim 1, wherein the diffraction device is directly formed on the incident side of the light separation/integration device, or manufactured separately and attached to the light separation/integration device.

35. The illumination optical system of claim 1, wherein the diffraction device is a diffraction device having a power.

36. The illumination optical system of claim 2, wherein:
the X-cube includes a coating layer which transmits or reflects light according to the incident angle of the light, and
the diffraction device adjusts the incident angle of the light on the coating layer so as to reduce a light loss of the illumination optical system.

37. The image display apparatus of claim 15, wherein the diffraction device is a diffraction device having a power and decreases the incident angle of the light so as to reduce a light loss of the image display apparatus.

38. The image display apparatus of claim 15, wherein:
the light separation/integration device includes a coating layer which separates the light incident thereon, and
the image optical system includes panels which receive the separated lights, respectively, and modulates the received lights to generate the image.

39. The image display apparatus of claim 15, wherein the diffraction device decreases the incident angle of the light so as to reduce a light loss of the illumination optical system.

40. The image display apparatus of claim 22, wherein the panel is a digital micromirror device and the optical path separation device is a total internal reflection (TIR) prism.

41. The image display apparatus of claim 22, wherein the panel is a liquid crystal on silicon (LCOS) and the optical path separation device is a polarization beam splitter (PBS).

42. An illumination optical system comprising:
light sources which emit lights having different wavelengths;
a light separation/integration device having incident sides facing the light sources, respectively, and an exit side from which lights from the light sources exit; and
diffraction devices provided directly on the incident sides of the light separation/integration device facing the light sources, respectively,
wherein the diffraction devices diffract the lights incident from the light sources to adjust an incident angle at the incident sides of the light separation/integration device to a predetermined range.

43. The illumination optical system of claim 42, wherein each of the diffraction devices adjusts a diverging angle of the corresponding light incident on the light separation/integration device so as to reduce a light loss and increase a light efficiency of the corresponding light output from the illumination optical system.

44. The illumination optical system of claim 11, wherein the optical path separation device reflects the light from the light source and transmits the light from the light separation/integration device.

\* \* \* \* \*

UNITED STATES PATENT AND TRADEMARK OFFICE
CERTIFICATE OF CORRECTION

PATENT NO. : 7,020,379 B2  Page 1 of 1
APPLICATION NO. : 10/600655
DATED : March 28, 2006
INVENTOR(S) : Young-chol Lee It is certified that error appears in the above-identified patent and that said Letters Patent is hereby corrected as shown below:

Column 7, line 45: delete "light." and insert -- light separation/integration device.-- therefor.

Signed and Sealed this

Eighth Day of August, 2006

JON W. DUDAS
*Director of the United States Patent and Trademark Office*